I. WAGEMAKER.
TAB CUTTING MACHINE FOR INDEX CARD GUIDES.
APPLICATION FILED SEPT. 7, 1917.

1,297,759.

Patented Mar. 18, 1919.
9 SHEETS—SHEET 1.

Inventor
Isaac Wagemaker
By Moulton & Linnane
Attorneys

I. WAGEMAKER.
TAB CUTTING MACHINE FOR INDEX CARD GUIDES.
APPLICATION FILED SEPT. 7, 1917.

1,297,759.

Patented Mar. 18, 1919.
9 SHEETS—SHEET 2.

Inventor
Isaac Wagemaker
By Moulton & Lirrance
Attorneys.

I. WAGEMAKER.
TAB CUTTING MACHINE FOR INDEX CARD GUIDES.
APPLICATION FILED SEPT. 7, 1917.
1,297,759.
Patented Mar. 18, 1919.
9 SHEETS—SHEET 3.
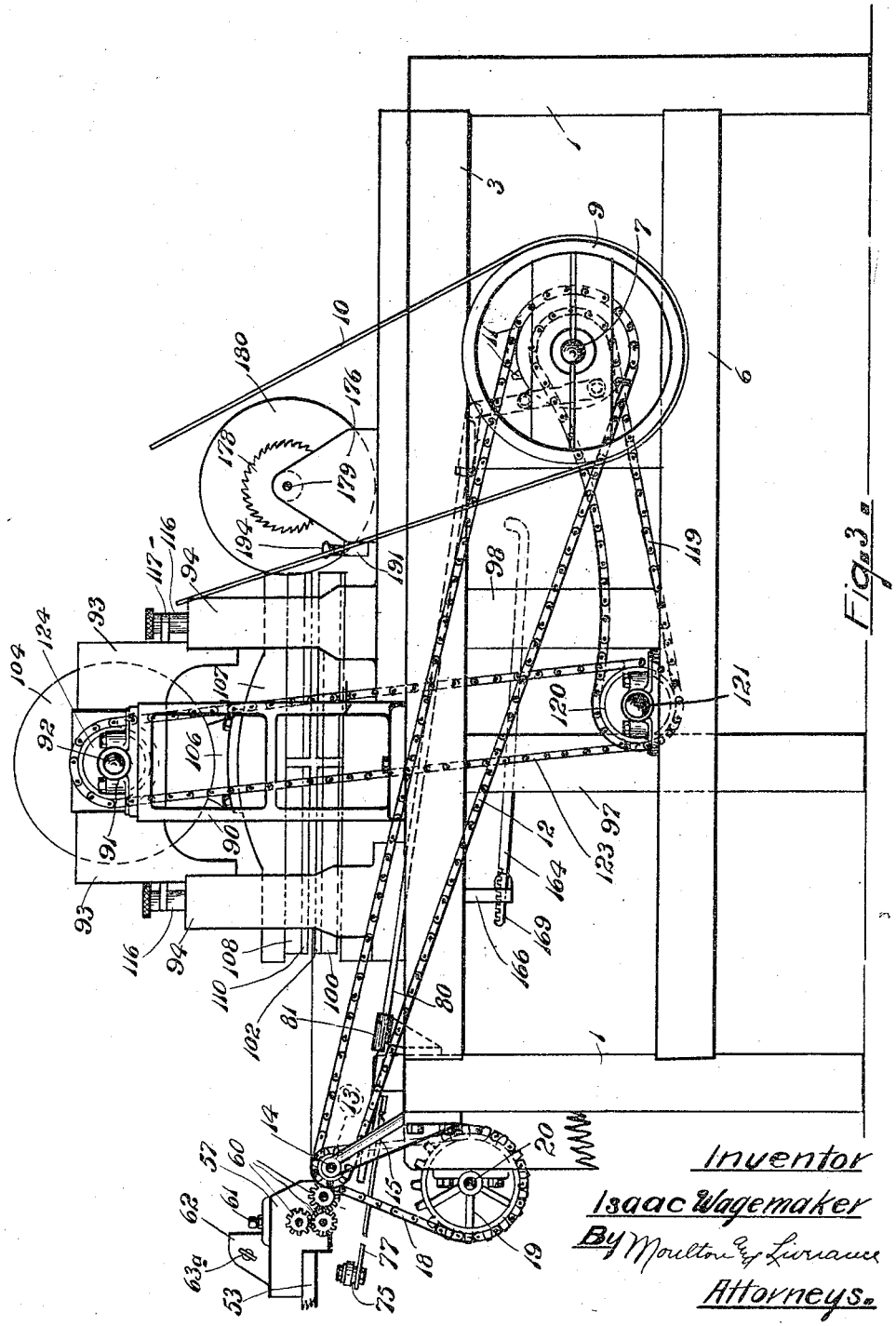
Inventor
Isaac Wagemaker
By Moulton & Livrance
Attorneys.

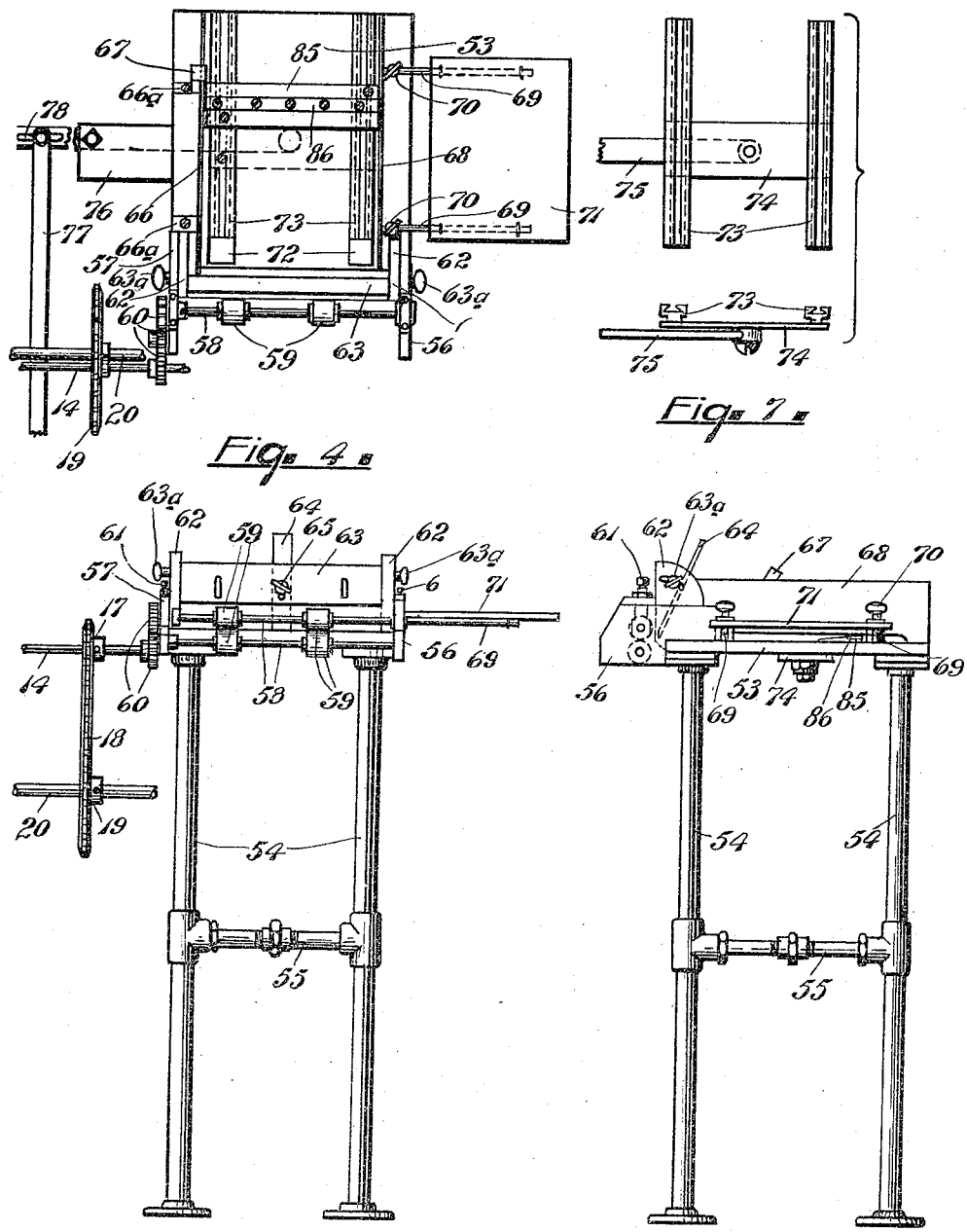

I. WAGEMAKER.
TAB CUTTING MACHINE FOR INDEX CARD GUIDES.
APPLICATION FILED SEPT. 7, 1917.

1,297,759.

Patented Mar. 18, 1919.

Inventor
Isaac Wagemaker
By Moulton & Lurrance
Attorneys.

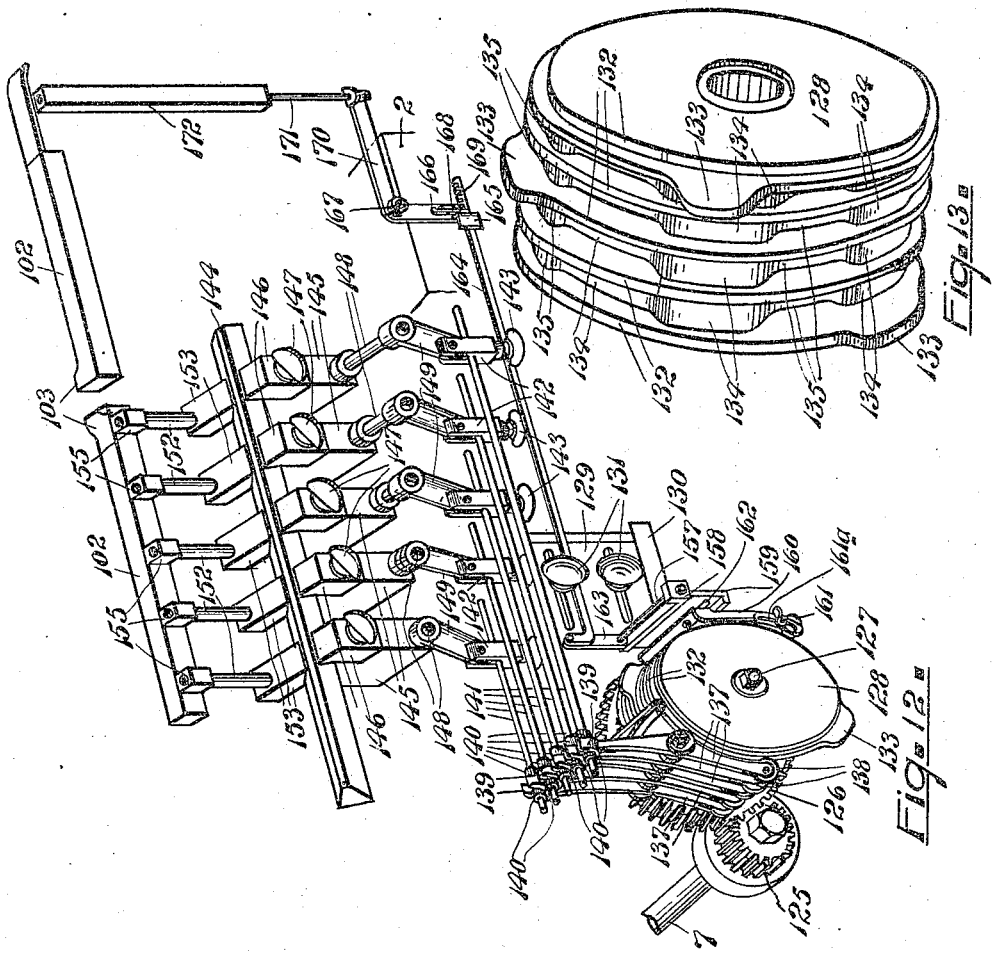

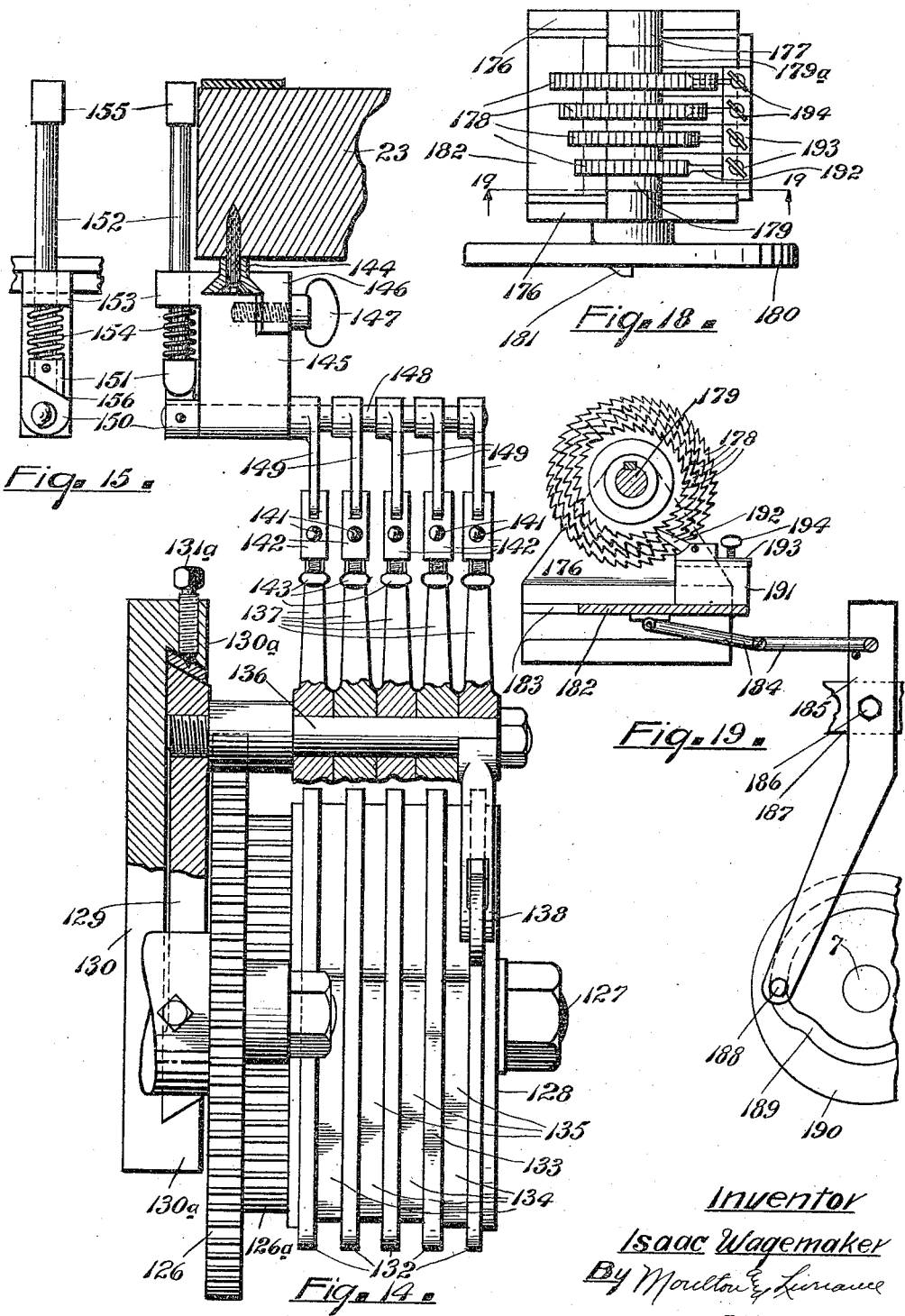

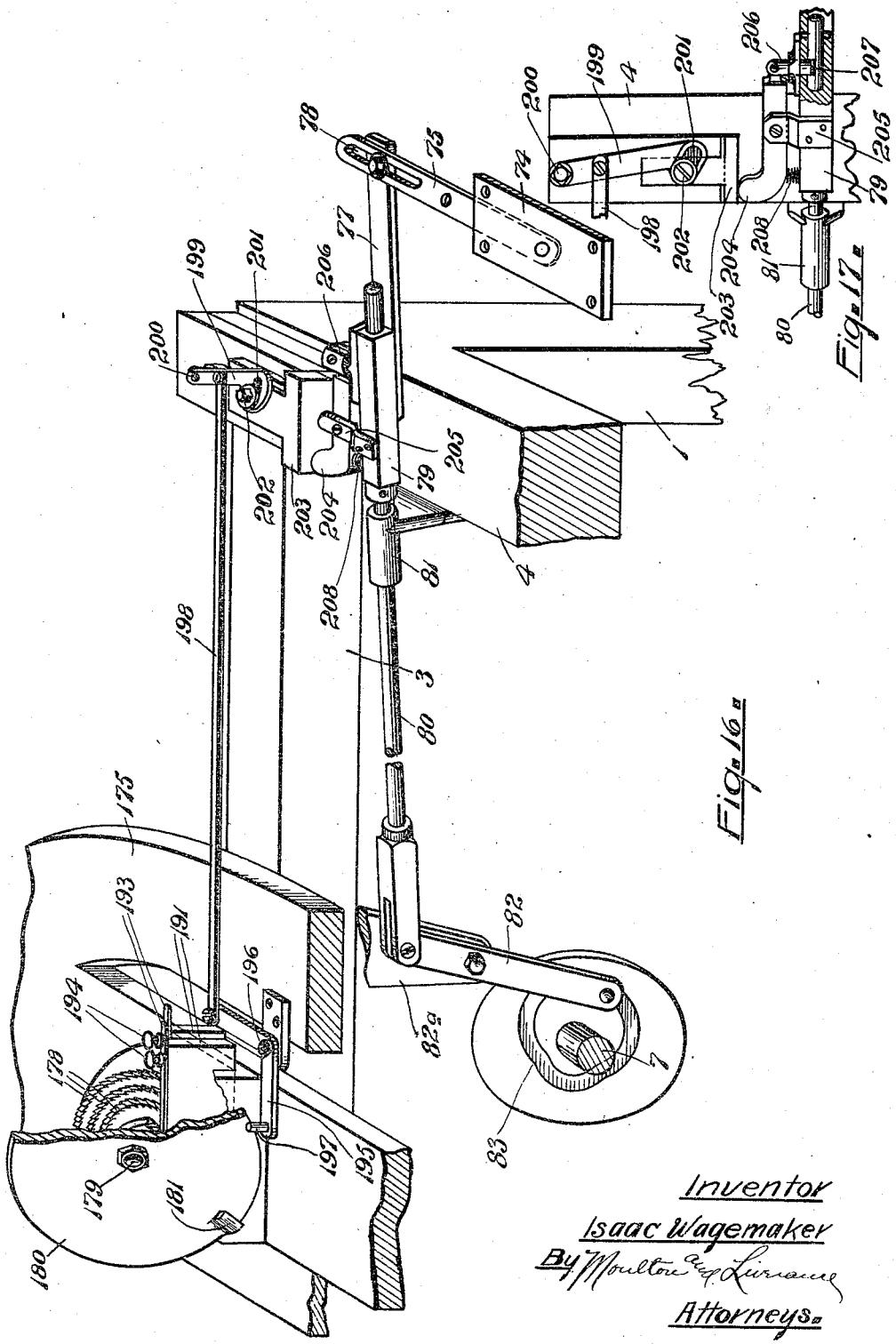

I. WAGEMAKER.
TAB CUTTING MACHINE FOR INDEX CARD GUIDES.
APPLICATION FILED SEPT. 7, 1917.
1,297,759.
Patented Mar. 18, 1919.
9 SHEETS—SHEET 9.
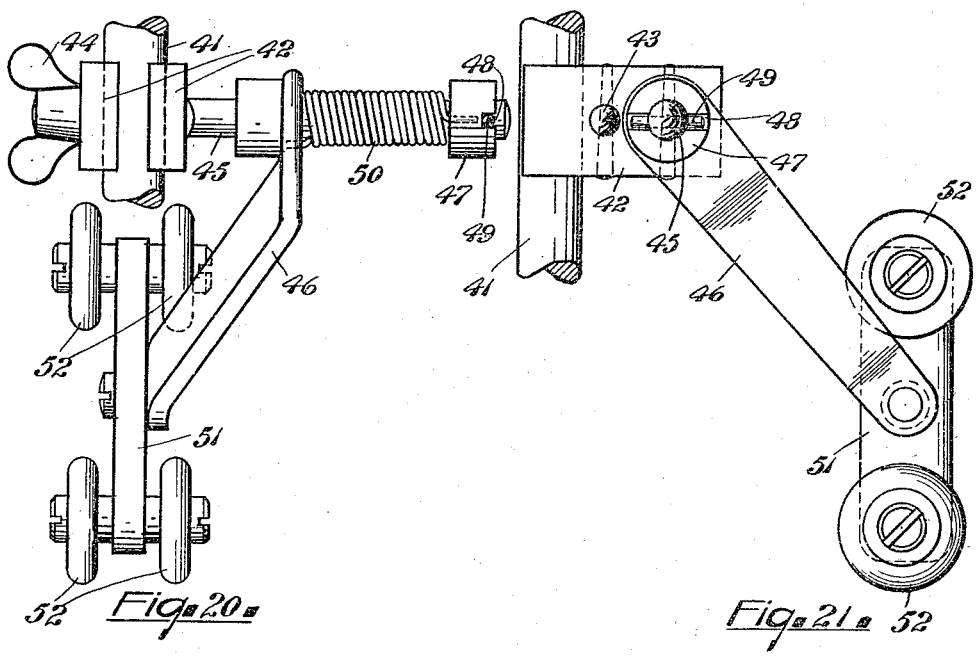
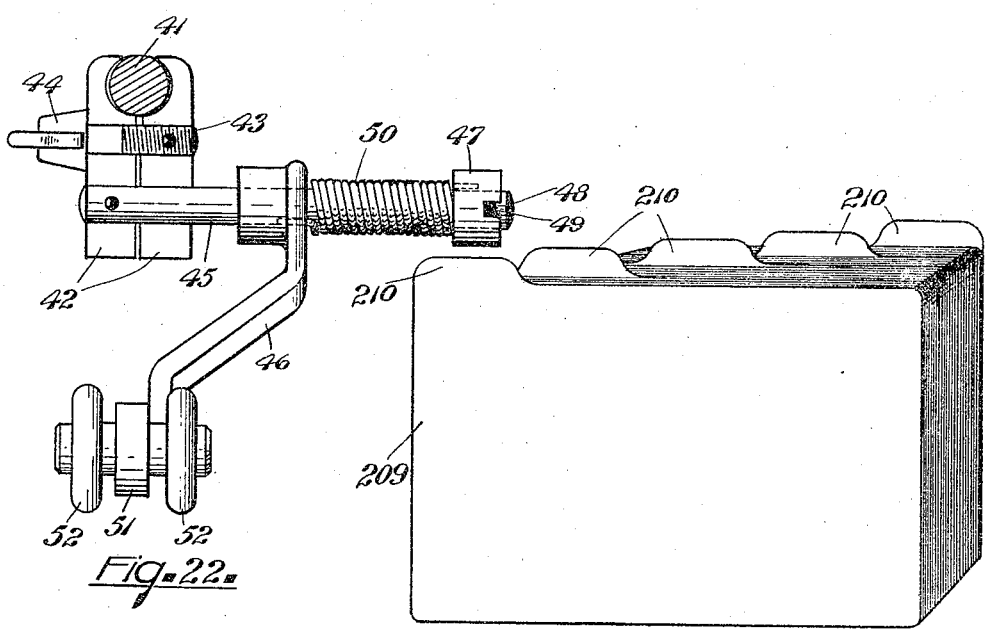
Inventor
Isaac Wagemaker
By Moulton & Linnane
Attorneys.

UNITED STATES PATENT OFFICE.

ISAAC WAGEMAKER, OF GRAND RAPIDS, MICHIGAN.

TAB-CUTTING MACHINE FOR INDEX-CARD GUIDES.

1,297,759. Specification of Letters Patent. Patented Mar. 18, 1919.

Original application filed October 25, 1915, Serial No. 57,742. (Patent No. 1,245,645, dated November 6, 1917.) Divided and this application filed September 7, 1917. Serial No. 190,235.

*To all whom it may concern:*

Be it known that I, ISAAC WAGEMAKER, a citizen of the United States of America, residing at Grand Rapids, in the county of Kent and State of Michigan, have invented certain new and useful Improvements in Tab-Cutting Machines for Index-Card Guides; and I do hereby declare the following to be a full, clear, and exact description of the invention, such as will enable others skilled in the art to which it appertains to make and use the same.

This invention relates to a mechanism by means of which guide cards for filing indexes may be automatically cut and stacked with projecting tabs formed at the upper edges of said guide cards which are located in different positions with respect to the bodies of the cards so as to be positioned in staggered relation behind each other. The present invention is a division of my previous application Ser. No. 57,742 filed Oct. 25, 1915 which has resulted in Patent No. 1,245,645, issued November 6, 1917. It is desirable at many times to make guide cards for use with card indexes without printing thereon, the indicating character or word applicable to any such guide cards being attached in some other manner than by directly printing upon the projecting tab. Furthermore, guide cards of this character are used without indicating characters of any type associated therewith. Previously it has been necessary in the manufacture of packs of index cards to cut a number of cards of the same kind, that is with the tab projecting at a certain portion or part of the upper edge of the card, and after this operation has been completed with respect to all of the various different cards necessary to make a complete pack, the cards are sorted and gathered together in proper relation to each other so that a plurality of complete file packs are obtained having tabs projecting therefrom at the upper edges of the cards and located in staggered relation one behind the other. While packs of index cards have been manufactured to a large extent in this manner, it is obvious that the process is long and comparatively costly and that it is practically necessary to have on hand a large stock of all of the many kinds of index card guides used at all times from which to fill orders.

It is an object and purpose of my invention to provide a mechanism into which a plurality of plain cards of rectangular outline may be fed which, during the course of their progress through the mechanism, are cut to leave a projecting tab at one edge, each card being cut differently from the cards preceding or following, such that when passed from the mechanism a plurality of cards having projecting tabs cut and positioned in proper relation to each other may be obtained, the pack of guide cards being complete and associated together ready for insertion into any proper filing receptacle. A further object of the invention resides in the provision of mechanism for successively cutting the tabs on successive cards so that when delivered from the machine they are located in stacked relation one behind the other. Still further objects of the invention consist in novel mechanism for periodically feeding the uncut cards to the machine; in the provision of novel regulator and card stopping devices for regulating the position of each card and holding it in said position during the operation of cutting the same; and in the provision of many new and useful features of adjustment for the machine, whereby it may be utilized to cut index cards of widely varying sizes with varying widths of index tabs, with different numbers of tabs in the length of a card in stacked relation and with the tabs located at any desired position on the different cards with respect to the complete packs of cards.

For the attainment of these ends as well as many others that have not been specifically stated but which will appear as the description progresses, I have embodied my invention in a mechanism fully described in the accompanying drawings, in which, Figure 1 is a side elevation of the cutting and delivering portion of the machine.

Fig. 3 is a view similar to Fig. 1 from the opposite side of the machine, and also showing, at one end, a fragment of the feeding mechanism which periodically feeds the cards into the machine.

Fig. 4 is a plan view of said feeding mechanism.

Figs. 5 and 6 are, respectively, front and side elevations thereof.

Fig. 7 shows in plan and front elevation a detail of the feeder mechanism.

Fig. 12 is a perspective view illustrating the regulating and stop mechanism for properly positioning the cards for cutting.

Fig. 13 is a perspective view of a composite cam controlling the operation of said mechanism.

Fig. 14 is an end elevation, with parts shown in section, of the stop mechanism.

Fig. 15 is a side elevation illustrating the construction of one of the plurality of stop members used with said stop mechanism.

Fig. 16 illustrates in perspective the mechanism used for operating the feeding device, and, also the mechanism for automatically rendering said feeding device inoperative under certain working conditions of the mechanism.

Fig. 17 is a plan view, enlarged and partly in section, showing the constructive detail through which said feeding device is rendered inoperative.

Fig. 18 is a plan view of the timing disk and ratchet wheels associated therewith.

Fig. 19 is a vertical section taken substantially on the line 19—19 of Fig. 18, and showing also the operating mechanism for actuating the ratchet wheels.

Fig. 20 is a plan view of one of the pressure devices underneath which the cards pass in the movements through the machine.

Fig. 21 is a side elevation.

Fig. 22 is an end elevation thereof partly in section, and

Fig. 23 is a perspective view showing in use part of a pack of guide cards as they are formed by my machine.

Like reference characters refer to like parts in the various views of the drawings.

Figure 1:
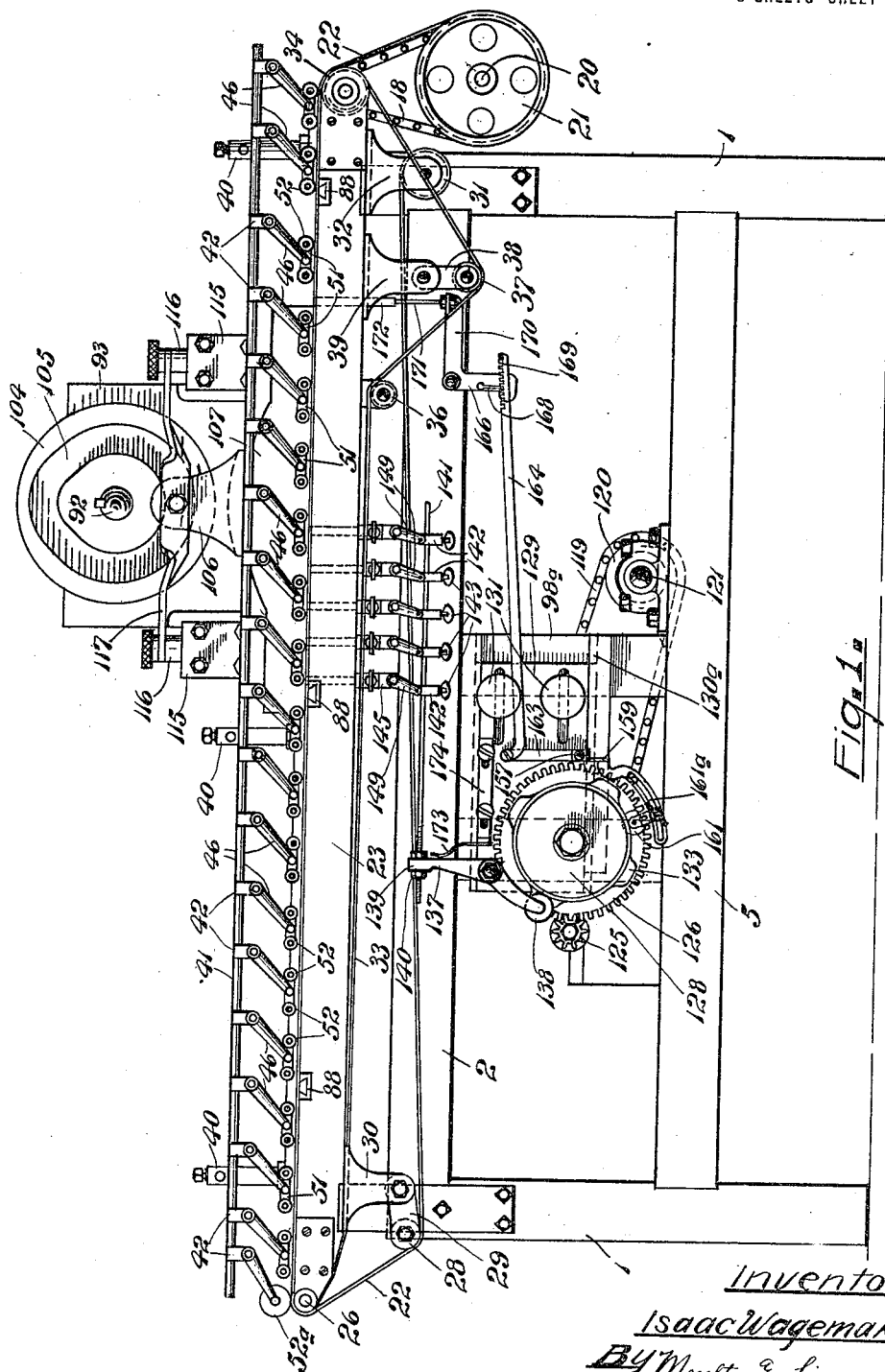
Figure 2:
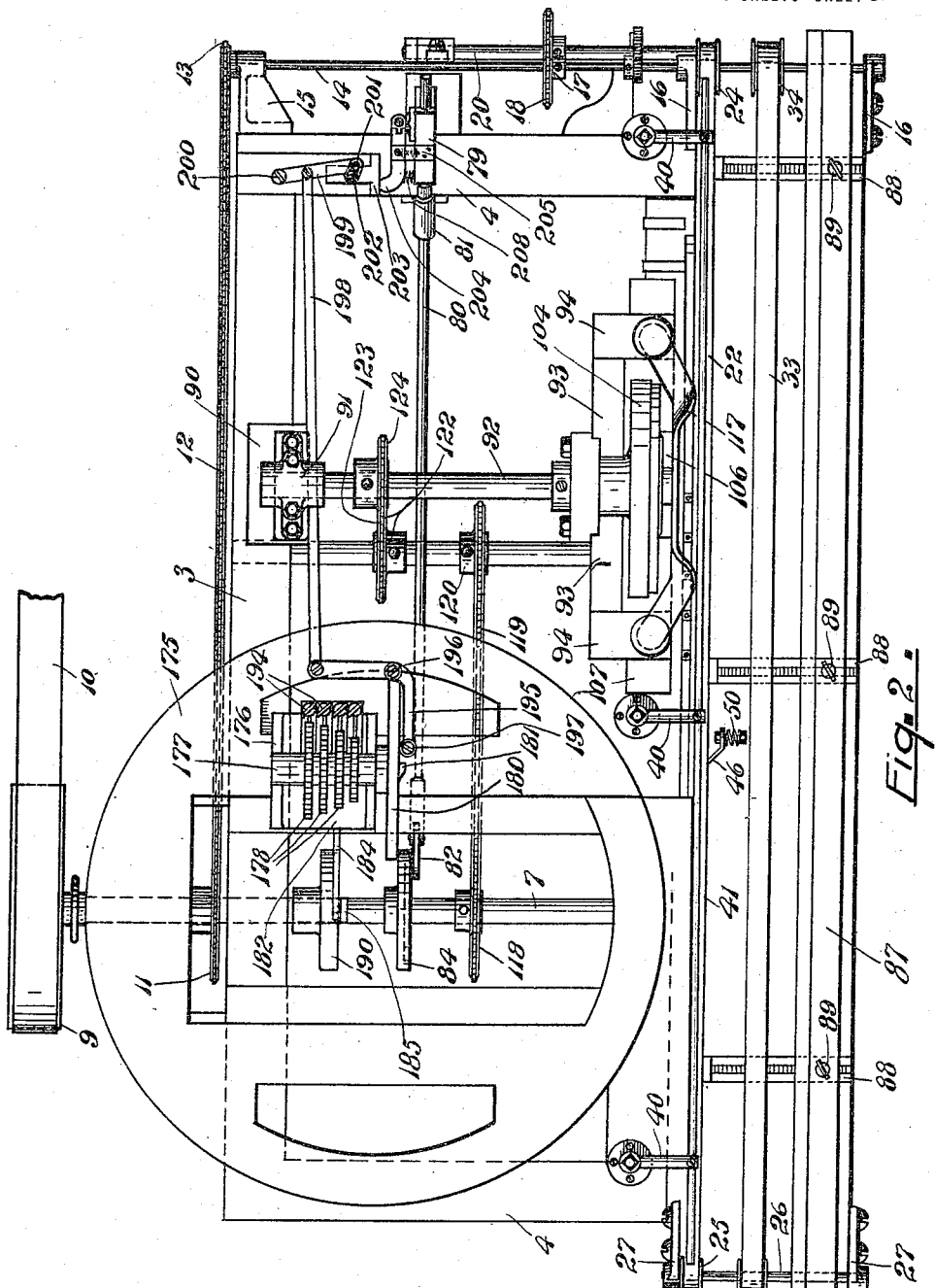
Fig. 2 is a plan view thereof.
Figures 8, 9:
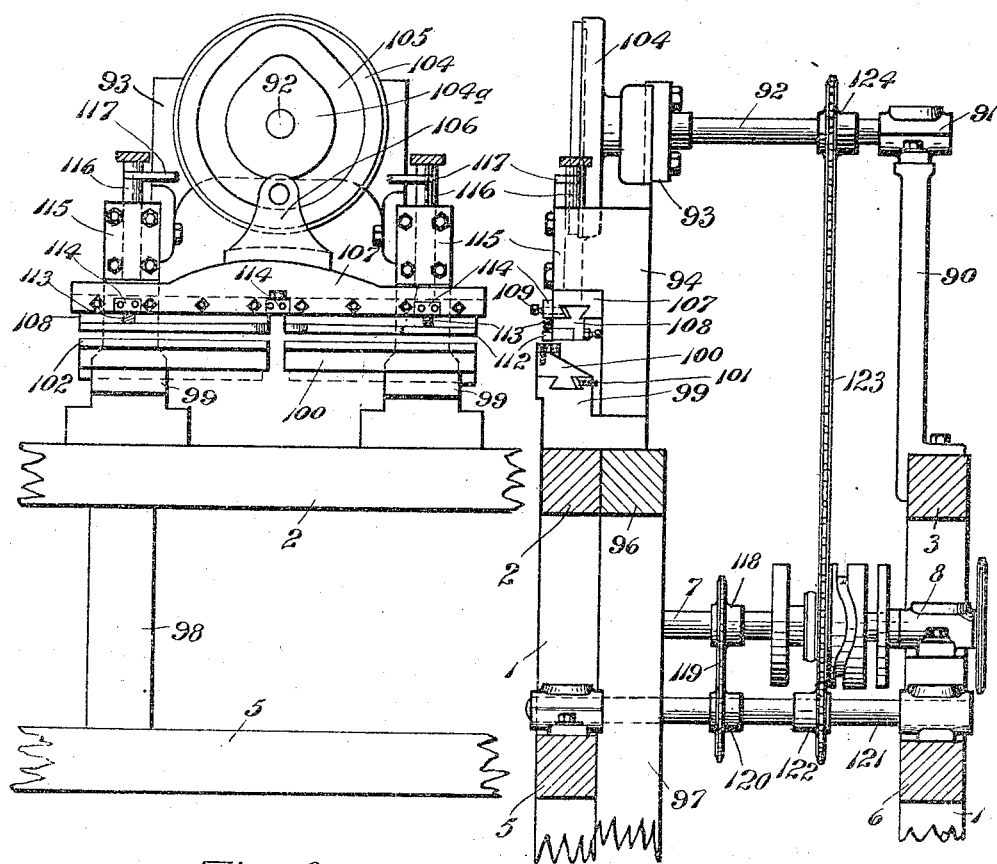
Fig. 8 is a front elevation of the immediate cutting mechanism for cutting tabs on the cards.
Fig. 9 is a side elevation thereof, the supporting frame being shown in vertical section.
Figures 10, 11:
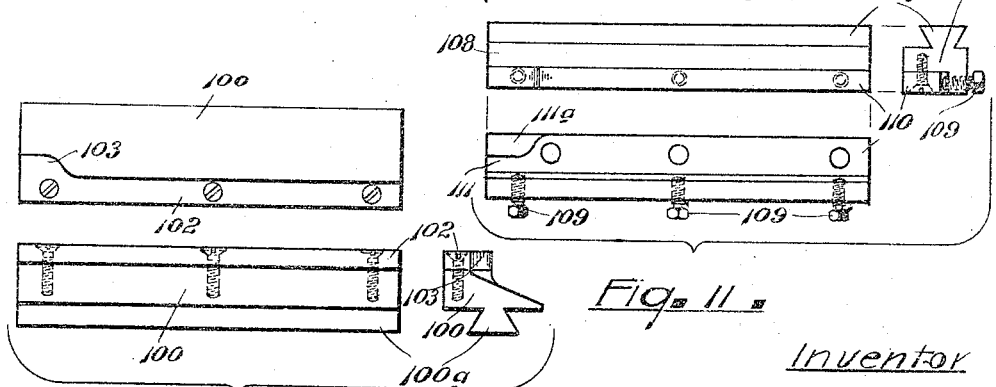
Fig. 10 shows a plan and a front and end elevation of the lower cutting knives of the mechanism.
Fig. 11 shows, similarly, the upper cutting knives.

The operating mechanism of the machine is carried on a suitable supporting structure including vertical posts 1, located at the corners of said structure which is rectangular in outline. The posts at one side of the frame are connected at their upper ends by a horizontal beam 2, while the posts at the opposite side are connected by an upper horizontal beam 3, transverse cross beams 4 connecting the upper ends of the posts at the ends of said horizontal beams. Additional horizontal beams 5 and 6 are provided below beams 2 and 3 respectively and are connected to the posts 1 to brace the same and serve as supports for various parts of the mechanism.

The mechanism as a whole is driven by a main driving shaft 7, rotatably mounted at its ends in suitable journals 8 on the beams 5 and 6, said shaft being located transversely of the frame. A driving wheel 9 is fixed to one end of the shaft which may be driven from any suitable source of power by a belt 10. A sprocket wheel 11 is secured to the shaft 7 driving an endless sprocket chain 12 which passes around a sprocket wheel 13 secured at one end of a shaft 14, which is supported for rotation by brackets 15 and 16 secured to the end posts 1 at the front end of the cutting section of the machine. A sprocket wheel 17 is fixed on shaft 14 and drives a sprocket chain 18 which passes around a sprocket wheel 19 attached to a shaft 20, located substantially directly underneath the shaft 14 and supported by brackets connected to the frame of the machine. A wheel 21 is secured to what may be termed the front end of shaft 20, an endless belt 22 passing around said wheel. A table 23 is rigidly connected to and projects in front of the supporting frame, the belt 22 leading from the wheel 21 of a pulley 24 at the front end of the table, thence passing the full length of the table and around a pulley 25 fixed on a short shaft 26 supported by brackets 27 at the rear end of the table, passing therefrom under the table and around an idle pulley 28 carried at one end of a link 29 which in turn is pivotally mounted on a bracket 30 attached to the under side of the table, and thence forward around an idle pulley 31, rotatably mounted on the lower end of a bracket 32 depending from the table, said pulley 31 being located adjacent to the wheel 21 previously noted. The weight of the idle pulley 28 and the pivotal connection of the link 29 serve to give a suitable tension to the belt 22. A short distance in front of belt 22 a similar belt 33 is positioned, it leading around a pulley 34 on the shaft 14, passing therefrom above and lengthwise of the table and around a pulley 35 on the shaft 26, thence under the table over an idle pulley 36 which is supported underneath the table, and therefrom under a pulley 37 carried at the end of a link 38 pivotally depending from a bracket 39 which is connected to the under side of the table. It is evident that proper tension is given to the belt 33 through link 38 and pulley 37.

A number of upstanding supports 40 are secured to the frame of the machine a short distance back of the table 23, serving to carry a rod 41 positioned horizontally and located above the belt 22. At a large number of spaced apart positions in the length of the rod 41 pairs of clips 42 are located and adjustably fixed to the rod by means of pins 43 and thumb nuts 44, each pin at one end being secured to one of the clips 42 of each pair of clips and passing through the other, its free end receiving the thumb nut. A rod 45 is fixed to one of the clips 42 of each pair; passing through the other toward the front of the machine, and on each of said rods an arm 46 is loosely mounted. A collar 47, provided with notches 48 in its outer face, is located adjacent the forward end of each rod, in which notches the ends of a pin 49, passing through the rod 45, seat. A coil spring 50 is interposed between each arm 46 and collar 47 serving to force the collar toward the pin 49. Also this spring may be wound by pressing the collar away from the pin so as to increase the tension thereof, and as the ends of the spring are connected to both the collar and the arm, the torsional effect of the spring is to force its connected arm, at its free end, in a downward direction. A bar 51 is pivotally mounted between its ends to the free end of each arm 46 and carries at each end short shafts on which rollers 52 are mounted. These rollers, preferably, have rubber surfaces and are forced by the tension of springs 50 against the belt 22. Cards entered at the front end of the table on to the belt 22 are carried with the belt when no obstruction is offered to their travel, the rollers 52 pressing the cards against the belt, but the pressure of the rollers is not great enough that injury occurs to a card if it is stopped at any point in its travel along the belt. The belt 33 is of use when wide cards are passed through the machine, it traveling with the same speed as the belt 22. The outer edges of the wider cards rest on belt 33 causing said cards to be carried better and more uniformly than if the single belt 22 was used.

The feeding mechanism by which the cards are periodically fed into the cutting section of the machine is located at the front end of said cutting section. In the construction of the feeding mechanism a horizontal base plate 53 is provided and supported at proper height, so that its upper side is in substantially the same horizontal plane with the upper side of the table 23, by posts 54 which are connected and braced by suitable cross members 55. Side members 56 and 57 are secured at the side edges of the base 53, adjacent the front end of the table 23, projecting upwardly from said base in which members the ends of upper and lower shafts 58 are rotatably mounted. Short rollers 59 are fixed on shafts 58, being positioned in contact with each other in pairs as best shown in Fig. 5. A plurality of small pinions 60 are secured to shafts 14 and 58 in driving engagement with each other, driving the shafts 58 and turning the rollers so that any card passed to the rollers from in front is gripped and run therethrough, being delivered to the belt 22. The pressure of the upper rollers against the lower rollers is regulated by set screws 61 which bear against the bearings for the upper shafts 58 which are slidably mounted in members 56 and 57.

A pair of supports 62 are located in contact with and secured to the inner sides of the members 56 and 57, between which is located an inclined plate 63 on which a finger 64 is adjustably mounted, the adjustment being secured by the pin, slot and thumb screw connection illustrated at 65. The finger 64 may be moved up or down to correspond to the various thicknesses of cards which pass underneath its lower end from the base 53 on which they rest. Also the inclination of the plate 63 may be changed by loosening the thumb nut 63$^a$, pins passing from the ends of the plate 63 through slots in the support 62 receiving the thumb nut 63$^a$ as will be understood. A side guide 66 is adjustably connected to the base 53 by means of brackets 66$^a$ adjacent the rear side of the table, on which an inclined gage 67 is slidably mounted, it being moved to any position on the guide to conform to any length of card placed upon the base 53. The inclination of the guide 67 is substantially the same as that of the fingers 64, so that when a pack of cards is placed between it and said fingers, the lowermost card is always located slightly in front of the card next above. At the opposite or forward side of the base 53 a second adjustable side guide 68 is mounted, it being carried at the ends of rods 69 which pass through suitable posts fixed to base 53 each carrying a set screw 70, whereby this side guide may be adjusted to any desired position for any width of card. The rods are extended a distance in front of the base 53 and may be also used to support a work table 71 on which a quantity of plain cards may be placed for convenient access for placing on the base 53.

A pair of spaced apart slots 72 are cut in and extend lengthwise of base 53, in which bars 73 are loosely mounted, the same being connected together by a transverse member 74 which is located underneath the base. A lever 75 is pivotally connected to the member 74 and is likewise pivotally mounted between its ends on a projecting support 76 extending to the rear of and connected to the base 53. A bar 77 is pivotally and adjustably connected to the opposite end of the lever 75, a slot 78 being formed in the lever for the purpose of such adjustment. Bar 77 extends to the rear and at its rear end is secured to the under side of a block 79 through which a rod 80 passes. The rod 80 extends loosely through a bracket 81 secured to the front upper cross member 4 of the main supporting frame. This rod is detachably connected to the block 79 as will hereafter appear and at its rear end has pivotal connection to the upper end of a lever 82, pivotally mounted between its ends on a suitable support 82ª connected to the main frame of the frame, and at its lower end having a pin which projects into a cam groove 83 formed in the face of a wheel 84 fixed on the driving shaft 7. Groove 83 is of such formation that with each revolution of the driving shaft lever 82 is oscillated about its pivot whereby rod 80 and the connected block 79 and bars 77 make a single complete reciprocation with each revolution of the driving shaft, the bars 73 likewise being similarly reciprocated but in a direction opposite to the movement of the bars 77. The bars 73 are formed with dove-tail grooves in their upper sides. A cross bar 85 is mounted between the bars 73 above the base 53 having parts entering the grooves in bars 73 whereby said cross bar may be adjusted to various positions with respect to the bars 73. A rib 86 is secured to the upper side of the bar 85, its edge projecting substantially the thickness of one card above the upper surface of the bar. Bar 85 tapers substantially to a point at its rear edge so that as it is moved to the rear with each revolution of the shaft 7, it passes underneath the pack of plain cards placed on the base 53, the member 86 engaging with the lowermost card in the pack and forcing it to the rollers 59, whereupon it is gripped by said rollers and fed onto the belt 22 to be carried under the rollers 52.

There is also mounted on the table 23 a guide plate 87 which may be adjusted transversely of the table through connection with guides 88 formed in the table, being held in any desired position by set screws 89. With narrow cards the belt 33 may be removed and the guide plate moved as closely as necessary to the belt 22.

A bracket 90 is connected to and projects upwardly from the horizontal beam 3 a distance back of the front end of the card cutting section of the machine, its upper end having a bearing 91 in which one end of a shaft 92 is rotatably mounted. The opposite end of the shaft is rotatably mounted in a bearing carried between rigid supports 93 which are interposed between and supported by two spaced apart upright standards 94 located on and extending above the front horizontal beam 2. In addition, an auxiliary horizontal supporting beam 96 is located back of the beam 2, being carried at the upper ends of two posts 97 and 98, the lower ends of the brackets 94 resting partially upon the beam 96. This additional supporting structure is incorporated in the machine on account of the extra weight and strain to which the support for the machine is subjected at these points. Each upright support 94 at its lower end is formed with a forwardly projecting section 99 adapted to carry horizontal members 100 which are attached to said sections 99 independent of each other, each having a dove tail projection 100ª on its under side seating in a groove of similar formation in the upper side of its associated supporting section 99. Members 70 100 may be slidably adjusted to any desired position with respect to sections 99 and held therein by set screws 101. A knife 102 is connected, by means of screws, to and located on the upper side of each of the members 100. The rear side of each knife lies in a straight line parallel to the length of the machine except at one end, adjacent ends of the knives being widened as indicated at 103.

A cam 104 is fixed to the front end of shaft 92, in the front face of which a cam groove 105 is cut of such formation that an inner cam is made concentric with the shaft through an arc of substantially 300 degrees, but having a projecting part, shown at 104ª, for the remainder of the circumference. A member 106 is suspended on a roller in groove 105 having a head 107 attached at its lower end, on the under side of which a pair of supporting members 108 are mounted each having a dovetail rib 108ª on its upper side slidably received within a dovetailed groove in the under side of member 107 whereby parts 108 may be adjusted to different positions with respect to the member 107, being held in place by set screws 109. Knives 110 are secured to the members 108 on the under sides thereof, said knives for the greater portion of their length being comparatively wide, but at their adjacent ends narrowing down as shown in 111 to leave recess 111ª of substantially the same form as the shoulder 103 on each of the knives 102. The upper and lower knives are so positioned with respect to each other that knives 110 pass just behind the knives 102 and any card positioned between them will, when the upper knives are carried to lower position, have parts sheared off, leaving a projecting tab at the points where the parts 103 pass within the recesses of the upper knives 110. The length of a tab is regulated by the adjustment of the knife carrying members 100 and 108 on their respective carriers 99 and 107.

With each revolution of shaft 92, the upper knives are raised and lowered once. The movement is relatively quick, taking place substantially in one-sixth of the revolution of the shaft, it being evident that during the remaining portion of the revolution of the shaft and attached cam 104, or while the roller on member 106 drives the circular section of groove 105, the upper knives remain at rest in their upper position. A stripping bar 112 is mounted directly in front of the upper knives 110 and is pressed downwardly by springs 113 which are located around pins carrying the stripping bar, the pins being slidably mounted in guides 114 attached on the front face of the head 107. On the downward movement of the upper knives, as the cutting of the card takes place, the stripping bar is forced against the lower knives 102 or against the card which lies over said knives thereby compressing springs 113, whereby on the upward movement of the upper knives, the stripping bar moves downwardly to its normal position and forces the card which has been cut away from the upper knives, this insuring against any tendency of the card to lift with the upward movement of the upper knives. Furthermore, the stripping bar pressing firmly against each card during the operation of cutting the same, serves to hold it firmly against movement. The movement of the head 107 is guided and steadied, there being provided forwardly projecting lugs 115, one of which is cast on each standard 94, through which rods 116 attached at their lower ends to the head 107 loosely pass, the upper ends of rod 116 being connected by a cross bar 117 which, at its middle, is secured to the member 106. Rods 116 have sliding movement through the projections 115 serving to steady the head 107 in its movements and insuring against swinging or vibration of the head and attached knives.

A sprocket wheel 118 is connected to the drive shaft 7 and drives an endless sprocket chain 119 passing around a sprocket wheel 120 secured to an intermediate shaft 121 mounted between and supported at its ends in bearings on the horizontal beams 5 and 6. A second sprocket wheel 122 is connected to shaft 121, it driving an endless sprocket chain 123 which passes around a sprocket wheel 124 on shaft 92. Wheels 118 and 120 are of the same size. Likewise, wheels 122 and 124 are of the same size so that with each revolution of the drive shaft 7, a single revolution of the shaft 92 takes place, and a single reciprocatory movement of the head 107 and attached upper knives occurs.

It is essential that the cards reach the cutting knives before the downward movement of the head 107 takes place, and also that they be stopped at proper positions so the tabs shall be formed at exactly the right places with respect to the bodies of the cards. The mechanism for effecting this is shown in enlarged detail in Figs. 12, 13, and 14. A pinion 125 is secured at the forward end of the drive shaft 7 and meshes with a gear 126 attached to a short shaft 127, on which shaft there is also removably fixed a composite cam indicated as a whole at 128. The shaft 127 is mounted upon and projects forward from a plate 129 slidably mounted in ways on the front face of a plate 130 attached to the frame of the machine. The plate 129 may be adjusted by movement in said ways with respect to the plate 130 and held in any desired position by set screws 131 and 131ª. The mechanism as it appears in the drawings is of such character that each tab on each card is cut substantially to occupy one-fifth of the width of a card and the tabs are so positioned on successive cards that when located one behind another, five of such tabs make the full width of a card and all appear from in front, being in staggered relation as shown in Fig. 23. For the cutting of the cards in this manner, the relation of the pinion 125 to the gear 126 is as 1 to 5. However, the machine is not limited to cutting this one kind of card as different relations of gears and different composite cams 128 may be used for different conditions; and the gears 126ª shown in Fig. 14 in front of gear 126 has a less number of teeth than gear 126 and may be made to mesh with a pinion fixed on shaft 7 having a greater number of teeth than the pinion 125, so that different ratios may be obtained. In fact, by use of proper gears such as 126ª and coacting pinions similar to pinion 125, a gear ratio of 1 to 1, 1 to 2, 1 to 3, or 1 to 4, may be obtained as well as the 1 to 5 ratio shown, the adjustability of the plate 129 permitting such interchange of gearing parts.

The composite cam is shown in enlarged perspective in Fig. 13, including five disks 132 each of which is provided with a single projection 133 at a part of its circumference. The projections occur in spaced apart relation on the various disks and not in the same position with respect to each disk. The disks 132 are separated by intermediate disks which are formed with consecutive projections and depressions 134 and 135. There are five projections and depressions in the circumference of each disk in the drawings shown, the lengths of the projections and of the depressions varying with different disks. This composite cam may also be made of widely varying structure including a less number of disks and a less number of consecutive projections and depressions on the intermediate disk members for various kinds of work.

A shaft 136 is secured to the plate 129 on which a plurality of levers 137 are pivotally mounted, on the lower ends of which below the shaft, rollers 138 are mounted which bear against the disks 132. There are five levers 137 in the construction shown so that each disk has a roller 138 bearing against it. The upper end of each of the levers is forked as shown at 139, the forks passing between collars or nuts 140, a pair of which are attached to each of five rods 141 extending forwardly from said levers. The rods 141 are of varying lengths and each at its forward end carries a block 142 adjustably connected thereto and held in any desired position by a set screw 143. On the under side of the table 23 a bar 144 is secured closely adjacent to the rear edge of the table, on which bar five blocks 145 are mounted by means of fastening blocks 146 and set screws 147, whereby, by loosening the set screws, any of the blocks 145 may be adjusted to and fixed at various positions along the length of the bar. A shaft 148 extends through each of the blocks, each at its front end being equipped with a downwardly extending arm 149, one of the blocks 142 being pivotally connected to the lower end of each of said arms. At its rear end each shaft carries a cam 150 against which a head 151 on a vertically positioned rod 152 bears, all of the rods 152, five in number, extending through integral projections 153 formed at the rear on blocks 145, coil springs 154 being interposed between the projections and the heads 151 of the rods to normally keep said heads in close contact with the cams 150. The rods 152 extend upwardly and are positioned closely adjacent the rear side of the table 23. Rods 152 at their upper ends are provided with stop heads 155 substantially rectangular in cross section which pass between the table 23 and the lower stationary knives 102. In their normal positions said heads lie slightly below the upper surfaces of the knives 102 and the upper surface of the table 23, but if at any time a shaft 149 is rocked, the inclined cam face 156 of the cam 150 fastened to said shaft in conjunction with the complementary lower face of the head 151 associated therewith, serves to elevate the associated rod 152 and project its head 155 above the upper surface of the table and the upper surfaces of said knives. It will be evident that with the revolution of the cam 128 and the passage of the projections 133 of disks 132 under the rollers 138, the levers 137 are successively actuated about their pivot and the various rods 141 are successively moved forward, thereby successively rocking the shafts 148 so that heads 155 are successively projected above the table. It is designed that the upward movement of the various heads 155 shall take place consecutively from one end to the other and in the course of five revolutions of the drive shaft 7, with the construction as illustrated in the drawings, all of the heads 155 will be elevated once as described. Preferably, the elevation of the heads occurs progressively from the rear toward the front. Any card that is being carried by the belts 22 and 33 is stopped when it strikes an elevated head. The mechanism is so designed and timed that such stopping occurs immediately before the downward movement of the head carrying the cutting knives takes place; and the projections 132 are of sufficient length that any head will be elevated and a card stopped long enough to permit the operation of the cutting mechanism and return of the cutting knives to upper position, after which the elevated head is returned to its normal lower position, the card operated upon being carried away by the belt and delivered from the machine at its rear end passing under the rear roller 52[a] as shown in Fig. 1. It will be clear that by reason of the consecutive elevation of stops occupying different relative positions with respect to the knives the cards are stopped at different relative positions on the table and with respect to the knives; that the tabs which are left are arranged, correspondingly, in different positions with respect to the bodies of the cards; and that with consecutive elevations of the heads 155 the tabs of cards following one after the other are moved over one step in the width of a card and with respect to the tab which was on the preceding card. Likewise, by reason of the adjustability of the blocks 145 and 142, it is possible to change the same for cards of different widths whereby the machine may be adjusted so that, irrespective of the dimensions of the cards, the tabs will always be cut on the various cards at proper position so as to locate properly in staggered relation one behind another on succeeding cards.

A short shaft 157 projects upwardly from the plate 121 in front of the cam 128, having a member 158 loosely mounted thereon from which a plate 159 extends in a downward direction. An arm 160 is mounted upon the plate and located adjacent the forward edges of the disks making up the cam 128, and carries a roller 160 which may be adjusted back and forth on the arm to various positions prescribed by the limits of the slot 161[a] in said arm. The arm at its upper end is also adjustably connected to the plate 159, a longitudinal slot 162 being made in the plate through which any suitable securing pin on the arm extends. Accordingly, the roller 161 may be adjusted so as to bear against any of the disks located between the disks 132. An arm 163 is secured to the shaft 157, projecting upwardly therefrom and having pivotal connection at its upper end to the rear end of a bar 164, the front end of which passes through an ear 165 formed on a downwardly extending arm 166 of a bell crank lever which is pivotally mounted at 167 on the beam 2. A dog 168 is pivotally mounted on the arm 166 and adapted to engage in any of the plurality of notches 169 formed in the upper side and adjacent the end of bar 164. The bell crank lever also includes a horizontal arm 170 which extends forwardly from the pivot 167 and is connected at its end to an upright rod 171, terminating in an upright bar 172, the upper end of which normally lies slightly below the upper surface of the table 23. As the composite cam is rotated, roller 161 following one of the intermediate disks of the cam, alternately seats in a depression 135 and rides over a projection 134, thereby raising and lowering the bar 172. Accordingly, with a complete revolution of the cam, bar 172 is raised and lowered five times with the construction shown; that is with every elevation of a stopping head 155, a corresponding elevation of the bar 172 takes place. The elevation of the bar 172 takes place before that of the stopping heads 155 and in such time as to stop each card fed into the machine, hold it for a period of time, and then release it for further travel such that the head 155 which is to later stop the card, will have had time to be elevated to stopping position. As the feeding of the cards to the carrying belt is not absolutely uniform this regulating device is essential as, otherwise, many times, cards would reach the position where they should be stopped by a head 155 before the head was raised, and either pass on without being acted upon by the cutting mechanism, or be broken or disrupted by the elevation of a head underneath them. Also, on account of the different positions of the stops 155, it is necessary that each card be stopped and later properly released by the regulating bar 172 so that the time when any card shall reach its stopping head 155 after the head has been raised shall be exactly equal to that of any other card and its stopping head. The projections and depressions 134 and 135 are properly formed, arranged, and timed so that this operation takes place. Furthermore with cards of varying sizes a regulating device of this character is necessary in order to properly guide and govern their travel through the cutting machine.

It is of course understood that many different constructions of composite cams 128 may be used for varying conditions respecting sizes of cards and number of tabs which may be cut in the width of a card. The cutting and regulating mechanism has been described with respect to a cam having five disks, each with a projection 133, between which are mounted other disks each of which has five projections and five depressions. It is of course obvious that a cam with a less number of disks, between which are mounted other disks having similarly a less number of projections and depressions respectively, may be used, in which case certain of the levers 137 and the stop mechanisms attached thereto will be inoperative. In such case the cards fed into the machine and cut, will be cut on the basis of two or three or four tabs for the width or for a part of the width of a card instead of five as described. To keep the levers 137 in contact with disks 132, leaf springs 173 are used, one of which bears against each lever 137. The springs are carried by a bar 174 which is adjustably mounted on a plate 129 so that the tension of the spring may be governed as desired at all times irrespective of any adjustment which may be made of plate 129 on its support 130.

A plate 175 rests upon and is secured to the main supporting frame of the machine, on which a pair of spaced apart vertical supports 176 are located terminating in bearings 177 at their upper ends. A plurality of ratchet wheels 178 are fixed to a shaft 179 which is interposed between and mounted in the bearings, the ratchet wheels being separated by collars 179ª. The shaft extends a distance in front of the front support 176 and has a disk 180 fixed thereon, on the front face of which a projection 181 is placed. There may be one or more of these projections as desired on different disks which may be substituted for the disk shown in which one projection 181 only is disclosed. A plate 182 is slidably mounted in slots 183, cut on the inner sides of the supports 176, to which plate, on its under side, one end of the rearmost of a pair of pivotally connected links 184 is connected, the front end of the front link having pivotal and detachable connection to an operating lever 185 pivotally mounted at 186 to any suitable support 187 which may in turn be connected to the main frame of the machine. The lever is positioned substantially vertical, its lower end carrying a rearwardly projecting pin which enters a cam slot 189 in the face of a cam wheel 190 fixed to the drive shaft 7. The slot 189 is of such formation that with each revolution of the drive shaft, plate 182 is moved back and forth once in the slots 183, the movement being relatively rapid in one direction and relatively slow in the other as will be evident from the formation of the slot 189 as shown in Fig. 19.

A plurality of blocks 191, one for each ratchet wheel, are secured adjacent one edge and on the upper side of the plate, each carrying a pawl 192 pivotally mounted on slides 193 which are adjustably mounted on the upper sides of the blocks 191 and adapted to be moved so as to engage with their respective ratchet wheels, being fixed in position with respect to the blocks on which they are mounted by set screws 194. In the operation of the machine one of the pawls only is engaged with one of the ratchet wheels serving in this manner to rotate the shaft 179 step by step with the operation of the machine. The ratchet wheels are formed with different numbers of teeth to take care of different conditions with respect to the number of cards in a pack and the like. It is of course apparent that under certain conditions, that is, when the number of cards is an exact multiple of the number of tabs cut in the width of a card, the ratchet wheels need not be rotated at all and under such conditions none of the pawls 192 will be in engagement with their respective ratchet wheels, or the link 184 may be disconnected from lever 185. A bell crank lever 195 is pivotally mounted at 196 on the plate 175, its rearwardly extending arm, as shown in Fig. 16, carrying an upright pin 197 which lies closely adjacent the disk 180 and in position such that when the projection 185 comes to the pin, it bears against and turns the bell crank lever about its pivot. A link bar 198 is connected at its rear end to the other drum of the bell crank lever and at its front has pivotal connection to and substantially mid-way between the ends of a member 199 which is pivotally connected at one of its ends, as indicated at 200, to the front cross beam 4 of the main supporting frame. At its opposite end, member 199 is enlarged and provided with a curved cam slot 201, through which a pin 202, fixed to a T-shaped member 203 slidably mounted on said beam 4, projects. The head of the member 203 bears against one end of a lever 204 pivotally mounted between clips 205 attached to and projecting from the block 79 previously described. A pin 206 is pivotally connected to the opposite end of the lever 204 passing through an opening in the side of block 79 and into a recess 207 cut in one side of the rod 80, being normally held in such position by a spring 208 positioned between lever 204 and block 79. As long as the pin is in engagement with the notch 207 in rod 80 the rod and the block 79 move together, the end of lever 204 passing back and forth across the head of the member 203. But when projection 181 on disk 180 bears against the pin 197, the pull given to the link bar 198 to the rear, operates member 199 about its pivot and forces the T-shaped member 203 against the end of lever 204, compressing the spring 208 and drawing pin 206 from the notch 207, thus freeing the rod 80 from the block 79, whereupon rod 80 may continue to reciprocate without any operation of the feeding mechanism taking place, and no cards are fed into the machine as long as the engagement of the projection 181 with pin 197 takes place. The travel of the belts 22 and 33 and the operation of the cutting head 107 continue, however, as well as the step by step rotation of the disk 180. Furthermore, as soon as the projection 181 has moved away from pin 197, the engagement of the pin 206 in notch 207 again takes place and the operation of the feeding mechanism is resumed. In this manner breaks in the continuous feeding of the cards to the machine may be automatically effected. This is of importance, especially when the number of cards in a pack is not a multiple of the number of tabs which are located in the width of the cards. In such cases there must be, between the last card of one pack and the succeeding card of the next pack, lapses of one, two, or more cards so as to start the next succeeding pack with the tabs properly positioned on the first card thereof. As previously stated, with the mechanism as shown in the drawings, when the number of cards in the pack is an exact multiple of 5, any stopping of the feed is not necessary and the mechanism just described is not connected with the rest of the machine, but if cards corresponding to certain of the months, one card for each day, were to be made, for instance, the mechanism would be needed. It may also be stated in this connection that the first card run into the machine and cut with its proper tab is the last card of a pack of guide cards, the cutting of the tabs on the cards being in reverse order. Such cutting of the cards however, is not an absolutely essential characteristic of my invention but is used in the present mechanism owing to convenience in receiving the cards in a receptacle when delivered from the rear end of the machine, the first cards underneath those which come later, whereby they may be taken from the receptacle properly located for entrance into any filing receptacle in which they may be used.

In Fig. 23 the product of the mechanism is disclosed in perspective as the cards are actually used in practice to separate matter that is filed between them. The cards 209 are located one behind another, and each at its upper edge has an upwardly projecting tab 210 on which any index characters may be written, or printed, or detachably secured in any desired manner, it being noted that the tabs on the various cards are in staggered relation so that all of the tabs may be seen from in front though the bodies of the cards are hidden by the first card of the pack. The mechanism which I have described is directed toward the cutting and delivering of such guide cards from the mechanism so that consecutive packs of cards are made properly sorted and positioned and ready for insertion into any filing receptacle; that is, this mechanism feeds the cards one at a time to the cutting section thereof, cuts the cards with tabs at one edge in staggered relation with either 2, 3, 4, or 5 tabs, and either the full width of a card or a part of the width of a card, and then delivers them from the machine at its rear end, the cards falling one over the other so that complete packs are produced ready for filing. The construction described is complete and operable and has had extensive practical use.

I have described the operation of the machine with respect to cutting and printing index card guides and separators, though it is to be understood that the machine is adapted to cut folders and like devices having projecting tab sections, the operation being the same in all respects. Other mechanisms not differing in essential principle from the invention described may be made without departing from the invention and I, accordingly, do not wish to be limited to the specific structure described, but consider that my invention includes all forms of structure which come within the scope of the appended claims defining the invention.

I claim:

1. In a mechanism of the character described, a feeding mechanism for delivering rectangular shaped cards therefrom one at a time, a carrying means on to which the cards are delivered, a cutting mechanism to which the cards are carried, said cutting mechanism including means to cut each card at one edge and leave a projecting tab at such edge, means to operate the cutting mechanism and feeding mechanism in synchronism whereby a card is delivered from the feeding mechanism for each operation of the cuting mechanism, and a series of stops, and means to automatically operate the same in succession into the paths of movement of the successive cards to stop said cards at the cutting mechanism for operation thereon and thereby cut successive cards differently, substantially as described.

2. In a mechanism of the character described, feeding and cutting mechanisms, means to operate said mechanisms in conjunction with each other whereby cards may be delivered one at a time from the feeding mechanism and afterward cut one at a time by the cutting mechanism, means to carry the cards from the feeding to the cutting mechanism, and means operating periodically with the operation of the machine to stop the successive cards in different relative positions with respect to the cutting mechanism to thereby cut the consecutive cards differently, substantially as described.

3. In combination, periodically operating feeding and cutting mechanisms, means to operate said mechanisms in conjunction with each other whereby cards may be delivered one at a time from the feeding mechanism and afterward cut one at a time by the cutting mechanism, continuously operating means to carry the cards from the feeding mechanism to the cutting mechanism, knives on the cutting mechanism for cutting portions away from each card at one edge and leaving a projecting tab, and means to stop the cards during the operation thereon of the cutting knives with the carrying means continuously in operation, substantially as described.

4. In combination, feeding and cutting mechanisms, means to operate said mechanisms in conjunction with each other to thereby deliver cards one at a time from the feeding mechanism and afterward cut them by the cutting mechanism, coacting knives included in the cutting mechanism for cutting the cards at one edge to have a projecting tab on each card, means to stop successive cards at different positions with respect to the cutting mechanism to thereby locate the tabs on successive cards in different positions with respect to the bodies of the cards, and means to carry the cards from the feeding to the cutting mechanism.

5. In combination, feeding and cutting mechanisms, means to operate said mechanisms in conjunction with each other to deliver cards one at a time from the feeding mechanism, and afterward cut them one at a time by the cutting mechanism, means to carry the cards from the feeding mechanism, coacting knives included in the cutting mechanism for cutting the cards at one edge to leave a projecting tab on each card, a plurality of stops located in alinement one after another adjacent the cutting mechanism, and means to operate the stops automatically and periodically with the operation of the machine and in succession into the path of movement of the cards to stop them during operation of the cutting mechanism.

6. In combination, feeding and cutting mechanisms, means to operate said mechanisms in conjunction with each other to deliver cards one at a time from the feeding mechanism, and afterward cut them one at a time by the cutting mechanism, means to carry the cards from the feeding to the cutting mechanisms, coacting knives included in the cutting mechanism for cutting the cards at one edge to leave a projecting tab on each card, a plurality of stops located one behind the other and having their upper ends normally positioned below the path of movement of the cards, means for elevating the stops one at a time immediately before the operation of the cutting mechanism, a regulating stop in front of the plurality of stops, and means to elevate said regulating stop into the path of movement of the cards to stop each card momentarily before it comes to the cutting mechanism, substantially as described.

7. In combination, a feeding mechanism having means to deliver cards one at a time therefrom, means to operate said mechanism, a conveying device on to which the cards are delivered, a cutting mechanism including a stationary lower knife over which the cards are carried periodically operable in synchronism with the operation of the feeding and cutting mechanisms, a plurality of stop devices operable in succession to stop each card with one edge of the card over said knife and with successive cards in different relative positions with respect to said lower knife, an upper relatively movable knife located above the lower knife, and means to move said upper knife downwardly after the card has been stopped, said knives being formed to cut portions from the card and leave a projecting tab at one edge thereof, substantially as described.

8. In combination, a feeding mechanism having means to deliver cards one at a time therefrom, means to operate said mechanism, a conveying device to which said cards are delivered, a cutting mechanism including a stationary lower knife over which the cards are carried, a plurality of movable stops located back of said knife, means to elevate the stops successively into the path of movement of the cards, to stop each card in position above said knife with successive cards in different relative positions with respect to the knife, an upper relatively movable knife located above the lower knife, and means to reciprocate the upper knife immediately after a card has been stopped, substantially as described.

9. In combination, a feeding mechanism having means to deliver cards one at a time therefrom, means to operate said mechanism, a conveying device to which the cards are delivered, a cutting mechanism including a stationary lower knife over which the cards are carried, a plurality of movable stops located back of said knife, means to elevate the stops successively into the path of movement of the cards, one stop being elevated for each card delivered by the feeding mechanism to stop each card in position above the knife with successive cards in different relative positions with respect to the knife, a vertically movable head, an upper knife attached thereto, a shaft, means to operate the shaft, a cam on the shaft and connections between said cam and head for moving it down and up with each revolution of the shaft to thereby cut the card between the knives, substantially as described.

10. In combination, a feeding mechanism including a support, a base secured thereto, a feeding bar lying immediately above the base, means to operate the bar back and forth over the base, shafts mounted one above the other at one end of the base, means to rotate the shafts, a conveying means back of said shafts, means to operate said conveying means, a cutting mechanism to which the conveying means leads, and means to operate the cutting means once with each back and forth movement of the feeding bar, substantially as described.

11. In combination, a feeding mechanism including a support, a base secured thereto, side guides adjustably secured to the base, an inclined cross member at the rear end of and supported a distance above the base, shafts having contacting rollers thereon positioned back of the base, means to continuously operate the shafts, a bar located transversely above the base, means to operate said bar back and forth over the base, a conveying means back of the feeding mechanism, means to continuously operate the conveying means, a cutting mechanism to which the conveying means leads, and means to operate said mechanism once with every back and forth movement of said bar over the base, substantially as described.

12. In combination, a feeding mechanism including a support, a base having longitudinal slots therein secured to the support, a bar pivotally mounted to and extending transversely under the base, means to move said bar back and forth about its pivot, bars seated in the slots and connected with the pivotally mounted bar, a bar adjustably secured to said bars above and transversely of the base, shafts located one above the other at the rear end of the base, a conveying means back of the shafts, means to continuously operate the conveying means, means to continuously rotate the shafts, a cutting mechanism to which the conveying mechanism leads, said mechanism including coöperating knives and means to bring said knives into operative relation once with each movement of the first mentioned bar back and forth about its pivot.

13. In combination, a feeding mechanism including a support, a base secured thereto, side guides adjustably secured to the base, an inclined cross member at the rear end of and supported a distance above the base, a finger adjustably mounted on the cross member, a gage having a rear inclined face slidably mounted on one of the side guides, shafts having contacting rollers thereon positioned back of the base, means to continuously operate said shafts, a bar transversely above the base, means to operate the bar back and forth over the base, means for adjusting the bar to move over different sections of the base, a conveying means back of the feeding mechanism, means to continuously operate the conveying means, a cutting mechanism to which the conveying means leads, and means to operate said mechanism once with every back and forth movement of said bar over the base, substantially as described.

14. In combination, a supporting frame, a table carried by said frame, an endless belt passing lengthwise over and under the table, means to feed cards one at a time on to the belt, a relatively stationary knife located adjacent one edge of the belt, a head positioned above said stationary knife, a second knife secured to the head, means to raise and lower the head in synchronism with the feeding means, a bar positioned on the head adapted to strike against the stationary knives when the head is lowered, and means yieldingly securing the bar to the head.

15. In combination, a supporting frame, a drive shaft mounted thereon, a table carried by the frame, a feeding mechanism positioned at the front end of the table having means to deliver cards one at a time therefrom, an endless belt passing lengthwise over and under the table receiving the cards from said feeding mechanism, means to drive said belt from the drive shaft, means to operate the feeding mechanism from the drive shaft, a cutting mechanism including stationary lower knives and movable upper knives in front of which the belt passes, and means to raise and lower the upper knives driven by the drive shaft, substantially as described.

16. In combination, a supporting frame, a drive shaft mounted thereon, a table carried by the frame, a feeding mechanism positioned at the front end of the frame, means for operating the feeding mechanism from the drive shaft to thereby deliver one card therefrom with each revolution of the shaft, an endless belt passing lengthwise over and under the table to which the cards are delivered, means for driving said belt continuously from the drive shaft, a cutting mechanism including stationary lower knives and movable upper knives in front of which the belt passes, means to lower and raise the upper knives once with each revolution of the drive shaft, and stop mechanism operated by the drive shaft for momentarily stopping the cards in position for action thereon by the cutting mechanism, substantially as described.

17. In combination, a supporting frame, a drive shaft mounted thereon, a table carried in front of the frame, a feeding mechanism positioned at the front end of the frame, means for operating the feeding mechanism from the drive shaft to deliver one card with each revolution of the shaft, an endless belt passing lengthwise over and under the table receiving the cards, means for continuously driving the belt from the drive shaft, yielding devices for forcing the cards into contact engagement with the belt, a cutting mechanism located adjacent the belt, means for operating the cutting mechanism once with each revolution of the drive shaft, a plurality of movable stops normally located back of and slightly below the upper surface of the table, and means to elevate one of said stops with each revolution of the drive shaft and to successively elevate all of the stops with successive revolutions of said shaft to stop the cards in position for operation thereon by the cutting mechanism.

18. In combination, a supporting frame, a drive shaft mounted thereon, a table supported in front of the frame, a feeding mechanism located at the front end of the frame, means for operating the feeding mechanism from the drive shaft to deliver one card with each revolution of the shaft, an endless belt passing lengthwise over and under the table and receiving the cards from the feeding mechanism, means for continuously driving the belt from the drive shaft, yielding devices for forcing the cards into contact engagement with the belt, a cutting mechanism located adjacent the belt, means for operating the cutting mechanism once with each revolution of the drive shaft, a plurality of movable stops normally located back of and slightly below the upper surface of the table, means to elevate one of said stops with each revolution of the drive shaft and to successively elevate all of the stops with successive revolutions of said shaft to stop and hold the cards in position for operation thereon by the cutting mechanism, a regulating stop located in front of said plurality of stops, and means for elevating the regulating stop with each revolution of the drive shaft.

19. In combination, a supporting frame, a table supported above and in front of the frame, a drive shaft on the frame, an endless belt passing lengthwise over and under the table, means to continuously drive the belt from the drive shaft, a feeding mechanism located at the front end of the table, means to operate said feeding mechanism from the drive shaft to deliver cards one at a time to the belt, one card being delivered with each revolution of the shaft, a cutting mechanism supported by the frame to which the cards are carried by the belt, means for operating the cutting mechanism once with each revolution of the drive shaft, a plurality of stops located one behind the other back of the table and normally positioned below the upper surface of the table, a cam having a plurality of spaced apart disks mounted on the frame, a projection on each disk, means interposed between the disks and stops to elevate a stop when a projection on a disk moves to operate said means, and means to drive the cam.

20. In combination, a supporting frame, a table thereon, an endless belt passing lengthwise over and under the table adapted to carry cards or like articles thereon, a periodically operated cutting mechanism adjacent the belt, means to operate the cutting mechanism, a plurality of stops back of and normally below the table located adjacent the cutting mechanism, and means to automatically elevate the stops in succession into the path of movement of the successive cards to stop each card for operation thereon by the cutting mechanism, successive cards being stopped at different positions, substantially as described.

21. In combination, a table, a conveying mechanism thereon, a feeding mechanism for feeding cards one at a time to the conveying mechanism, a cutting mechanism for cutting the cards located adjacent the conveying mechanism, a plurality of blocks supported under the table, a shaft in each block, a cam on the end of each shaft, a vertically positioned bar loosely carried by each block, each having a head at its upper end and a cam at its lower end contacting with the cam on its adjacent shaft, means normally holding said rods in lower position with the heads below the upper surface of the table, a cam having a plurality of spaced apart disks each with a projection thereon, levers pivotally mounted between their ends one for each disk and engaging with the disks, arms on the shafts in the blocks, rods interposed between the ends of said levers and arms, and means to operate the feeding mechanism, cutting mechanism, and conveying mechanism and to rotate the cam.

22. In combination, a feeding mechanism having means to deliver cards one at a time therefrom, a support back of the feeding mechanism, an endless belt mounted thereon, means to operate the belt, means to operate the feeding mechanism to deliver the cards to the belt, a cutting mechanism positioned back of the table to which the cards are carried by the belt, means included in the cutting mechanism for cutting portions away at one edge of each card to leave a projecting tab, means to operate the cutting mechanism once with each card delivered to the belt, stops positioned one behind the other adjacent the cutting mechanism, means to elevate the stops in succession to hold the cards for operation thereon by the cutting mechanism, and means to render the feeding mechanism inoperative for a predetermined period covering the time used on one or more operations of said feeding mechanism with the belt, cutting mechanisms and stops continuing their operations, substantially as described.

23. In combination, a support, a drive shaft mounted thereon, a lever pivotally mounted on the support, means interposed between the shaft and lever for oscillating it about its pivot once with each revolution of the drive shaft, a feeding mechanism including a pivotally mounted arm, a bar pivotally connected to the end of the arm, a block secured to the bar, a rod pivotally connected to the lever extending loosely through the block, said bar having a notch therein in one side, a pin extending through the block into the notch, and means operated by the drive shaft for withdrawing the pin from the notch for a predetermined period to permit the movement of the rod while the block and attached portions of the feeding mechanism remain at rest.

24. In combination, a support, a drive shaft thereon, a lever pivotally mounted on the support, means between the lever and drive shaft for oscillating the lever about its pivot with each revolution of the drive shaft, a feeding mechanism including a pivotally mounted arm, a bar pivotally and adjustably connected to the end of the arm, a block secured to the bar, a rod pivotally connected to the lever and extending loosely through the block, said bar having a notch in one side, a pin passing through the block and normally seating in the notch, a lever pivotally mounted between its ends on the block to which the pin is secured, a ratchet wheel mounted on the support, means to move it one step with each revolution of the drive shaft, a disk having a projection on its face movable with the ratchet wheel, a bell crank lever pivotally mounted on the support having a pin interposed into the path of movement of said projection, a second block slidably mounted on the support and bearing against the free end of the lever mounted to the first block and means interposed between said block and the bell crank lever for moving it against to actuate said lever and withdraw the pin from said notch while the projection on the disk engages with the pin on the bell crank lever.

In testimony whereof I affix my signature.

ISAAC WAGEMAKER.

Copies of this patent may be obtained for five cents each, by addressing the "Commissioner of Patents, Washington, D. C."